E. E. EVENSON.
SNAP HOOK.
APPLICATION FILED MAR. 10, 1917.

1,286,566.

Patented Dec. 3, 1918.

WITNESSES
E. R. Ruppert
F. Hough

INVENTOR
E. E. Evenson
BY Victor J. Evans
ATTORNEY

UNITED STATES PATENT OFFICE.

EDWARD E. EVENSON, OF RIO, WISCONSIN.

SNAP-HOOK.

1,286,566.   Specification of Letters Patent.   Patented Dec. 3, 1918.

Application filed March 10, 1917. Serial No. 153,896.

*To all whom it may concern:*

Be it known that I, EDWARD E. EVENSON, a citizen of the United States, residing at Rio, in the county of Columbia and State of Wisconsin, have invented new and useful Improvements in Snap-Hooks, of which the following is a specification.

This invention relates to a snap hook, with the primary object of the invention being to provide a hook of this character which will be strong and durable in use and has a shank so constructed that the hook may be readily and securely connected with an end of a strap and in such a manner as to render its accidental disconnection therefrom while the hook is in use practically impossible.

With these and other objects in view, the invention resides in the novel combination and arrangement of parts, which will be hereinafter described and particularly pointed out in the claim.

The preferred embodiment of the invention has been illustrated in the accompanying drawing, although no restriction is necessarily made to the precise details of construction therein shown, as changes, alterations, and modifications, within the scope of the claim may be resorted to when desired.

In the drawings.

Like characters of reference denote corresponding parts throughout the several views in the drawing.

Figure 1:
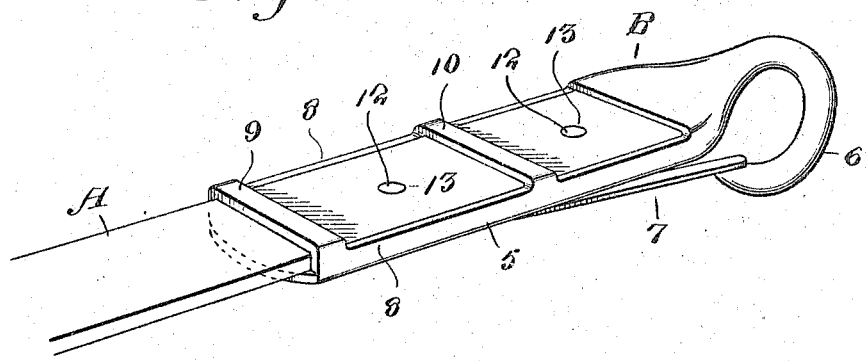
Figure 1 is a perspective view of the improved snap hook, showing the same connected with a strap.
Figure 2:
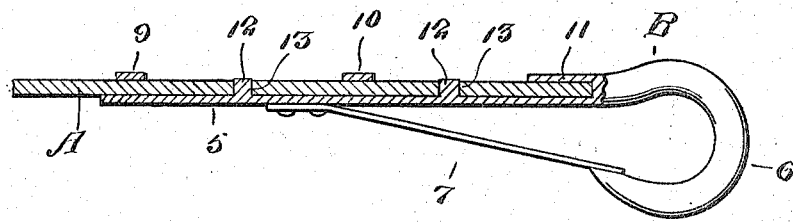
Fig. 2 is a vertical longitudinal section through the shank of the snap hook and strap connected therewith.
Figure 3:
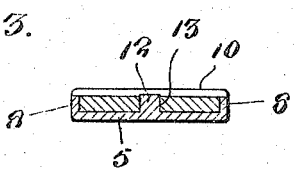
Fig. 3 is a transverse section on the line 3—3 of Fig. 1.

Referring now to the drawing in detail, the letter A designates a portion of a strap with which is shown connected the improved snap hook B, said hook comprising a flat rectangular shaped shank 5 terminating at one end in a hook 6, the bill of which is engaged by an end on a spring tongue 7 secured to the shank 5 between its ends in any suitable manner.

Arranged at opposite sides of the shank 5 and extending longitudinally thereof throughout its length are side flanges 8 having connected therewith cross bars 9 and 10 beneath which a portion of the strap A is passed. The flanges 8 serve to guide the end of the strap A when passed along the shank and into a pocket 11 formed in the hook 6 at its intersection with the shank.

Formed on the shank 5 are spaced studs 12 which when the end of the strap is arranged beneath the cross bars 9 and 10 may be passed through the openings 13 therein, said strap being held engaged with the studs by the cross bars 9 and 10 which not only serve this purpose but materially assist in bracing the flanges 8 and through their arrangement with relation to the studs 12 permit the snap hook to be adjusted longitudinally of the end of the strap when the occasion requires.

The other end of the shank 5 is extended beyond the cross bar 9 to serve as a directing lip in facilitating the passage of the end of the strap beneath the cross bar 9.

When it is desired to apply the improved snap hook to a strap as shown in Fig. 1 in the drawing, the end of the strap is arranged within the channel formed in the shank by the flanges 8 with the cross bars 9 and 10 overlying the strap. The studs 12 are now passed through the openings 13 in the strap which causes the free end thereof to be positioned within the recess 11 at the inner end of the hook thus enabling the cross bars 9 and 10 and the studs 12 to firmly secure the hook to the strap.

From the foregoing description, taken in connection with the accompanying drawing, it is at once apparent that a snap hook has been provided in which the shank is so constructed as to permit the snap hook to be readily and securely connected with the end of the strap when the occasion requires.

It will be understood from the foregoing that the shank constructed and arranged in accordance with my invention has a smooth and continuous body portion which is adjacent to and extends from the mouth of the snap hoop and is therefore adapted to protect the strap against frictional or other wear incidental to the engagement of the hook with another article; and in this the side flanges 5 coöperate since they guard the side edges of the strap. It will also be noted that the said smooth and continuous body portion affords a strong connection for the tongue of the hook.

Having thus described the invention, what is claimed as new, is:

As a new article of manfacture, a snap hook having an integral shank; the said shank being made up of a continuous smooth and imperforate body portion that is arranged adjacent to the mouth of the hook and extends from the back of said mouth, a pocket formed in the shank back of said body portion and at the inner end of the hook, side flanges on said body portion and extending throughout the length of the same from the mouth of said pocket rearwardly, cross-bars interposed between said side flanges, and studs extending from the back of the body portion at a point between the cross-bars and a point between the pocket and the forward cross-bar, respectively; the body portion being extended rearwardly beyond the rear cross-bar and forming a guide lip, and a resilient tongue affixed to the face of the body portion of the shank and normally resting against the outer portion of the hook and guarding the mouth thereof.

In testimony whereof I affix my signature.

EDWARD E. EVENSON.

Copies of this patent may be obtained for five cents each, by addressing the "Commissioner of Patents, Washington, D. C."